Dec. 1, 1942.  T. B. GIBBS  2,303,540
WATCH TIMING APPARATUS
Filed Feb. 8, 1937  6 Sheets-Sheet 2
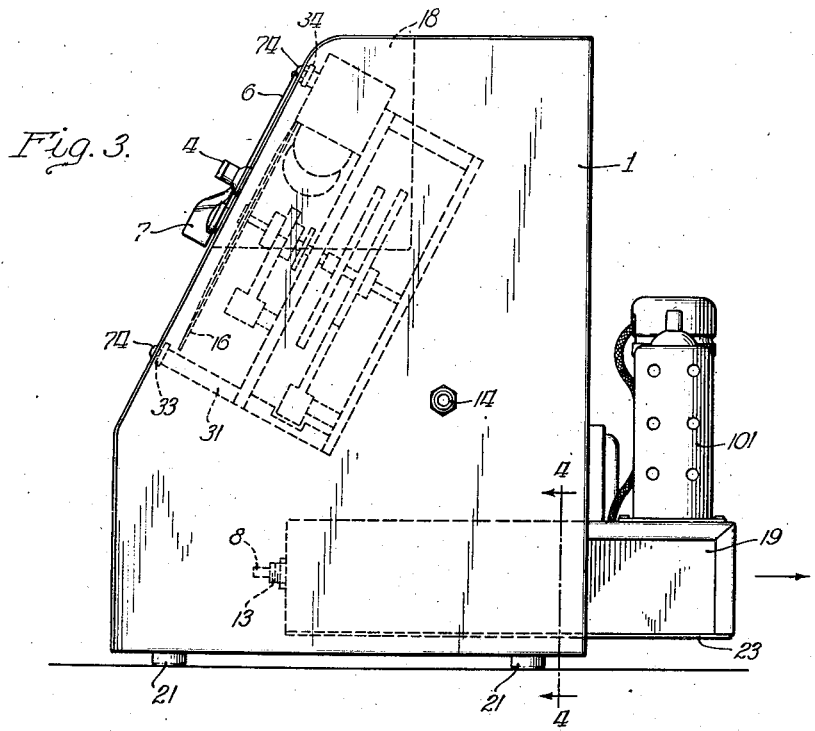
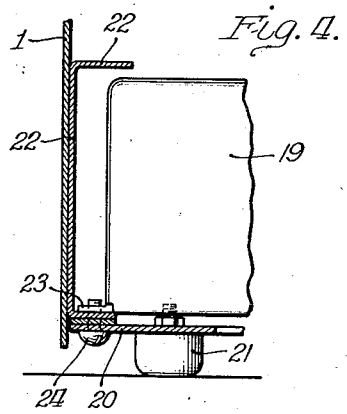
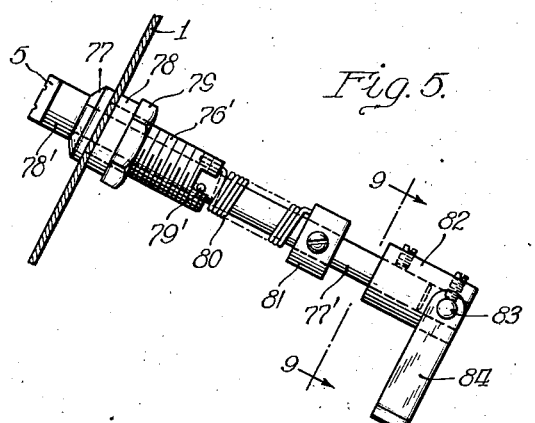
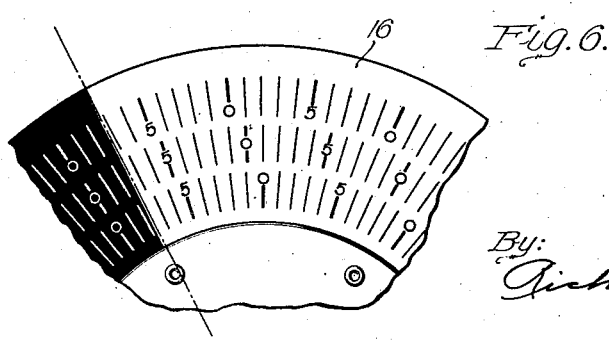
Inventor:
Thomas B. Gibbs Dec. 1, 1942.  T. B. GIBBS  2,303,540
WATCH TIMING APPARATUS
Filed Feb. 8, 1937  6 Sheets-Sheet 3

Inventor:
Thomas B. Gibbs
By: Richardson & Auer
Attys.

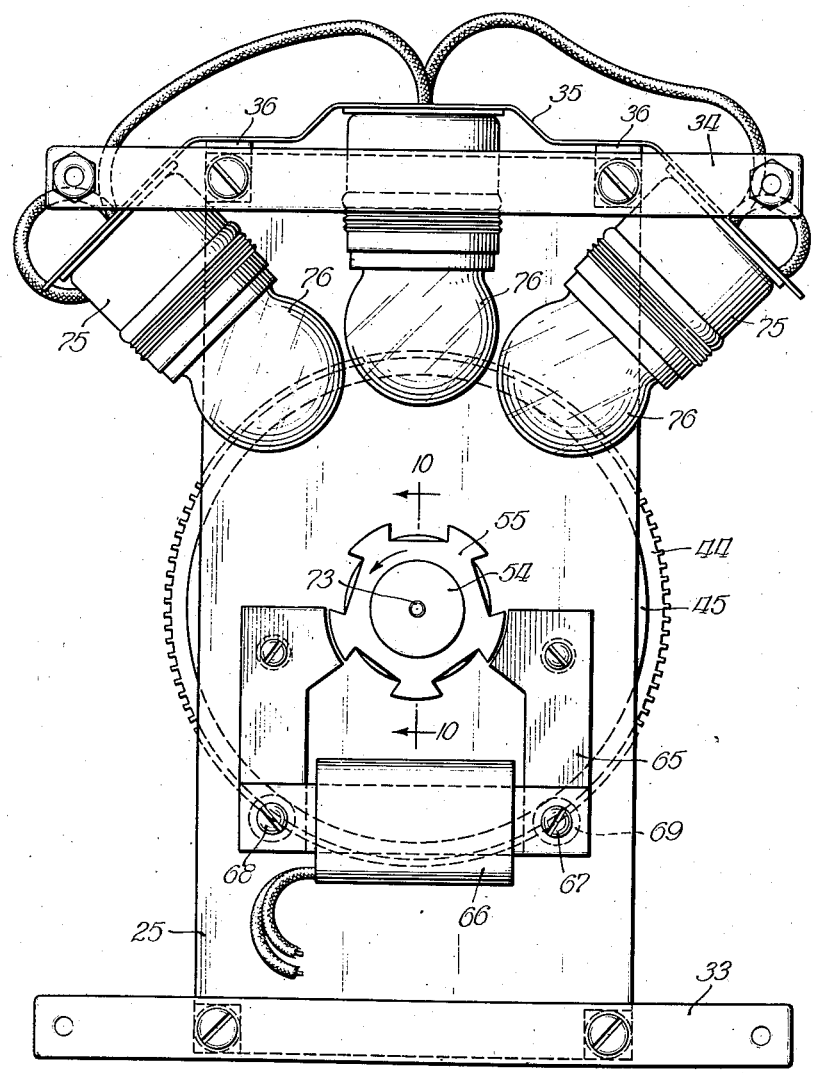

Dec. 1, 1942.   T. B. GIBBS   2,303,540
WATCH TIMING APPARATUS
Filed Feb. 8, 1937   6 Sheets-Sheet 5
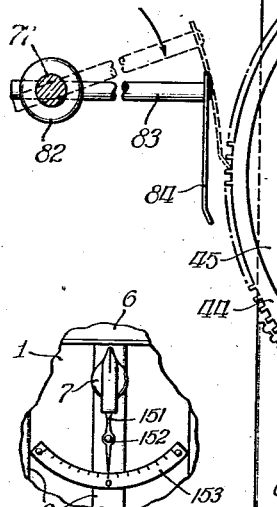
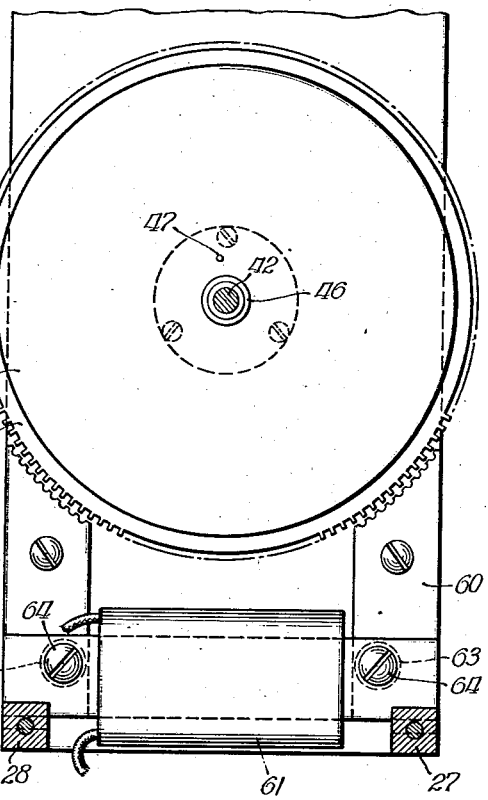
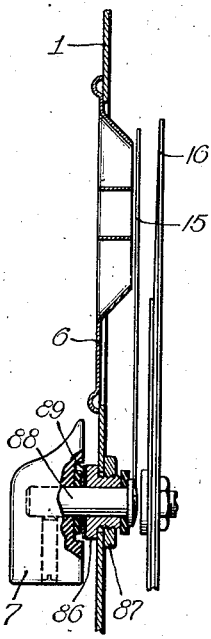
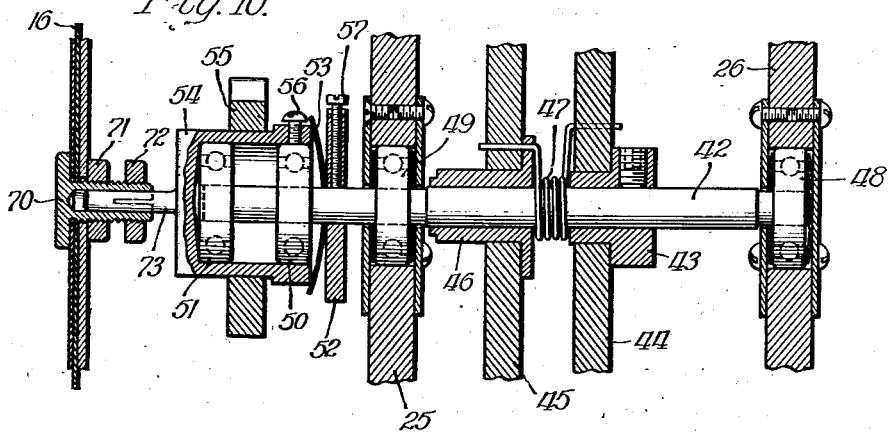
Inventor:
Thomas B. Gibbs
By: Richardson & Auer
Attys.

Patented Dec. 1, 1942

2,303,540

UNITED STATES PATENT OFFICE 2,303,540

WATCH TIMING APPARATUS

Thomas B. Gibbs, Chicago, Ill., assignor to George W. Borg Corporation, Chicago, Ill., a corporation of Delaware Application February 8, 1937, Serial No. 124,571

10 Claims. (Cl. 73—52)

The present invention relates in general to watch timing apparatus, and more in particular to watch timing apparatus of the stroboscopic type. The object of the invention is to produce a new and improved apparatus of this character.

The invention and the various features thereof will be described in detail hereinafter, reference being made to the accompanying drawings, in which—

Fig. 3 is a view from the right as the apparatus appears in Fig. 1, with the back plate removed and the amplifier chassis partly withdrawn;

Fig. 4 is a section through one corner of the casing, taken on the line 4—4 of Fig. 3;

Fig. 5 is a detail showing the construction of the motor starting device;

Fig. 6 is a fragmentary view of the dial, showing the calibration thereof;

Fig. 8 is a view of the motor unit taken from the left in Fig. 7, with the dial removed;

Fig. 9 is a section through the motor unit on the line 9—9, Fig. 7;

Fig. 10 is a section through the shaft of the motor unit on the line 10—10, Fig. 8;

Fig. 11 is a section through a portion of the casing on the line 11—11, Fig. 1, showing the zero position indicator;

Fig. 13 shows a modification which enables a departure from the correct time to be read directly on a scale.

Figure 1:
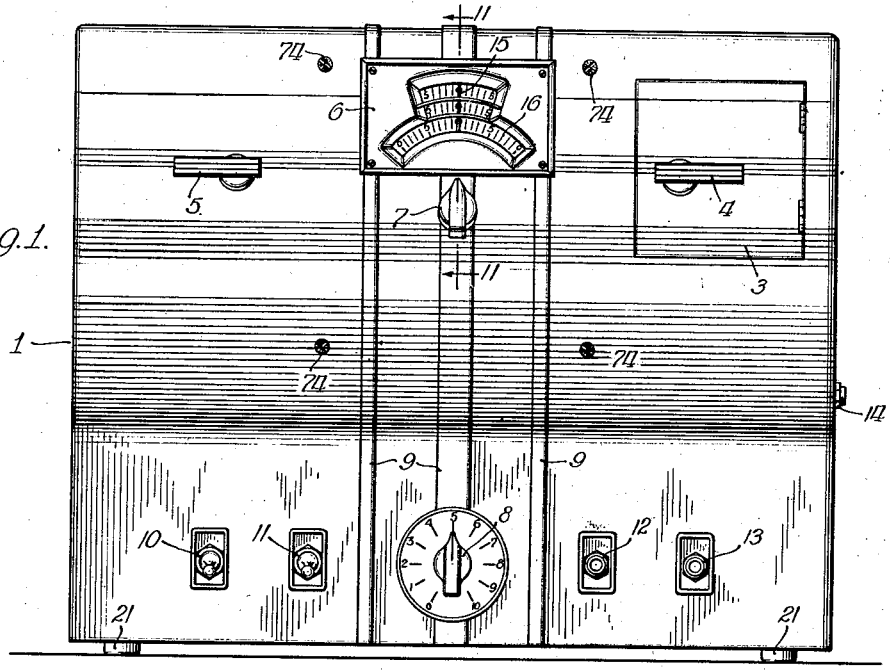
Fig. 1 is a front view of the complete apparatus.
Figure 2:
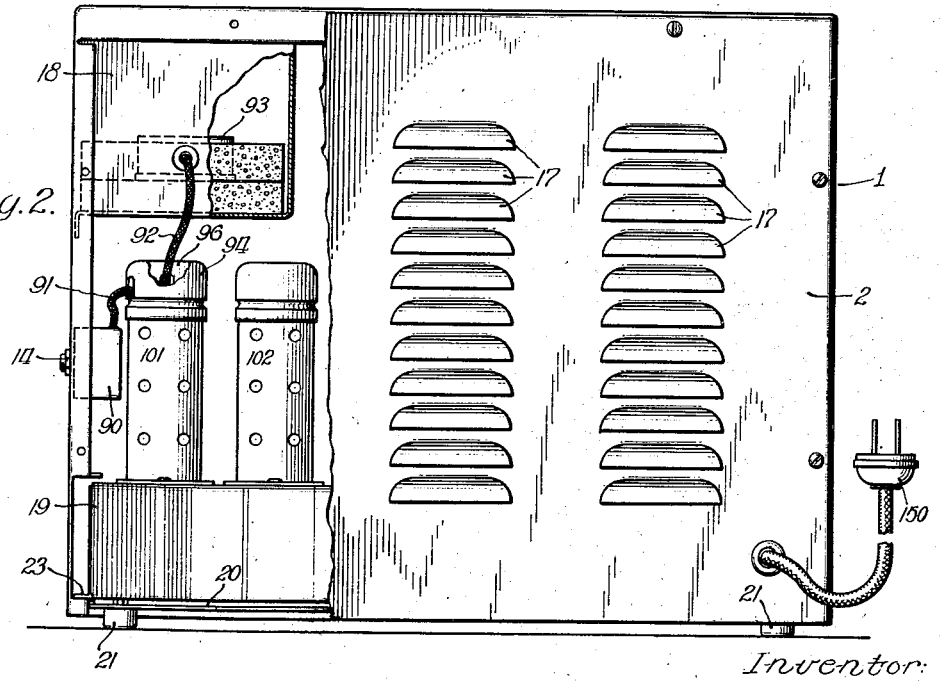
Fig. 2 is a rear view, with a portion of the back plate cut away to expose the interior.

Referring to the drawings, the apparatus is all housed in a casing 1, the shape of which is clearly shown in Figs. 1, 2, and 3. The casing is preferably made of sheet metal with a suitable exterior finish, and may be further ornamented in front by strips 9 of nickel or chromium plated material. The front of the casing includes a lower vertical portion on which switches 10 and 11, volume control knob 8, and phone jacks 12 and 13 are mounted. These items will be further explained in discussing the circuit drawing, Fig. 12. The remainder of the front of the casing is sloping toward the rear, as shown in Fig. 3. On this sloping portion there appears at the right the handle 4 for the door 3 of the master watch compartment, and at the left the operating lever 5 of the motor starting device. In the center near the top an opening is cut in the casing, over which is secured by screws a small panel 6. This panel has curved depressions formed therein, open at the back, which constitute windows through which can be seen the calibrations on the dial 16 and the indicator or pointer 15. The latter is attached behind the front wall of the casing to the rotatable knob 7.

The rear of the casing is closed by a back plate 2, as seen in Fig. 2. This plate may have louvres 17 to provide for ventilation of the interior. A portion of the back plate has been cut away at the left to expose the master watch compartment 18. This compartment is also shown in dotted lines in Fig. 3, so that the dimensions will be clear. Access to the compartment is obtained by means of door 3, Fig. 1. The compartment contains a number of sponge rubber blocks which support a crystal or piezo electric microphone 93, which is preferably of the type shown in my co-pending application, Serial No. 124,570, filed on even date herewith, now Patent 2,175,021.

Fig. 2 also shows a portion of the chassis 19 on which the various vacuum tubes, transformers, resistors, condensers, switches, jacks, and other electrical parts are mounted. These parts will all be explained in connection with the circuit drawing. The arrangement of the parts on the chassis follows standard practice and consequently the details are not shown.

The bottom of the casing is closed by a bottom plate 20, to which are secured four rubber knobs which rest on a table or bench where the apparatus is used and support the weight thereof. The arrangement for attaching the bottom plate 20 and the supporting means for the chassis 19 is more clearly shown in the detail view, Fig. 4. Each side wall of the casing 1 has near its lower edge a channel member such as 22, which may be spot welded to the casing. The chassis 19 has at each side a projecting edge portion or extension 23. The extensions 23 rest on the ledges formed by the lower horizontal portions of the two channels, which support the weight of the chassis. The bottom plate is secured against the lower side of these ledges by four or more screws such as 24, being spaced away a short distance by interposed washers, as shown. The screws such as 24 are threaded in the projecting edges 23 of the chassis and therefore serve not only to hold the bottom plate 20 in place, but also secure the chassis rigidly in position. This avoids putting any strain on the switches and jacks, such as 10—13, which are mounted on the chassis 19, but project through and are held to the front of the casing 1, as shown in Fig. 1, by hexagonal nuts which also hold the designation plates in place.

The chassis may be pulled out part way in case it becomes necessary to replace or repair any of the parts mounted thereon. The back plate 2 may first be removed, and then the nuts on the front of the casing, which hold on the designation plates associated with switches and jacks 10—13, are removed. The knob 8 also has to be taken off. The screws 24 may now be removed, after which the chassis 19 may be pulled out like a drawer. If it is desired to pull it out very far, it will be necessary to remove shielding and grid connections, which, however, are detachable at the tubes, by slipping off the shield caps and grid clips.

Figure 7:
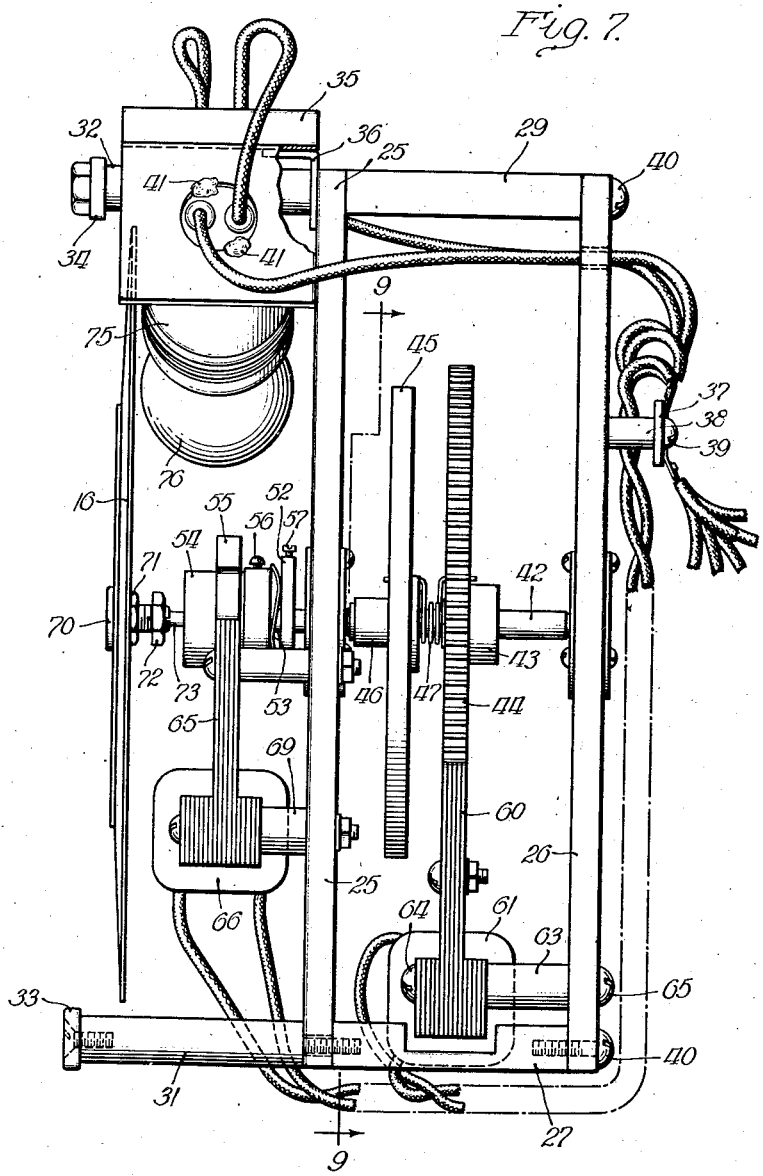
Fig. 7 is a side view of the motor unit, removed from the casing.

The motor unit is shown in Fig. 7 and in other views which will be referred to. The function of the motor unit is to drive the dial 16 at a uniform speed, by power derived from a 60-cycle commercial alternating current source, and under control of the master watch, to secure the exact speed desired. The position of the motor unit in the casing is shown by dotted lines in Fig. 3, from which it can be seen that the unit is supported against the sloping part of the front wall of the casing, with the upper part of the dial 16 just behind the windows in panel 6.

The frame of the unit comprises two rectangular steel plates 25 and 26, which are spaced apart by two square bars 27 and 28, Figs. 7 and 9, at the lower end of the frame, and by two square bars, such as 29, at the upper end. At the right side of the frame they are secured to frame plate 26 by four screws such as 40. At the left side of the frame are four studs having reduced end portions passing through the plate 25 and threaded into the bars such as 27. The construction is clearly shown in connection with the stud 31 and bar 27, Fig. 7.

The two upper studs, such as 32, also serve to attach the lamp assembly to the frame. This assembly comprises a strip of heavy sheet metal 35, bent to the form shown in Fig. 8, and having three lamp sockets, such as 75, attached thereto. The sockets may be soldered to strip 35, as indicated at 41, Fig. 7. The strip 35 is held in position by two small brackets 36, which may be spot welded to the strip 35, and are clamped between the studs such as 32 and the frame plate 25. The combination is clearly shown in Fig. 7, where a portion of the strip 35 is cut away to partly expose the bracket 36.

The frame is secured to the casing by means of two cross pieces 33 and 34, Figs. 7, 8, and 3. These cross pieces are secured to the ends of studs, such as 31 and 32, by means of flat head screws, the holes in cross pieces 33 and 34 being countersunk to receive the heads of the screws. As shown in Fig. 3, the lower cross piece 33 lies against the casing and is held in place by two screws 74, the heads of which appear in Fig. 1. Two similar screws 74 secure the upper cross piece 34 to the casing. Here there are two nuts or washers interposed so as to space the cross piece away from the casing to clear the upper edge of the depressed window and the ends of the screws serving to attach the panel 6. The studs 32 are of course made slightly shorter than studs 31, in order that the dial 16 may be parallel to the front of the casing.

The running parts of the motor unit may now be considered. The motor comprises a shaft 42, a toothed armature 44, a field magnet 60, and a fly wheel 45. The shaft 42 is supported in the frame plates 25 and 26 by ball bearings 49 and 48. The construction is shown in detail in Fig. 10. The armature 44 is pressed onto a hub 43, which latter is secured to the shaft 42 by a set screw. The field magnet, seen clearly in Fig. 9, has a winding 61, and is mounted on the frame plate 26 by means of screws and two spacers 63, Fig. 7. The spacers are secured to plate 26 by two screws 65, and the field magnet is secured to the spacers by two screws 64.

The fly wheel 45 is pressed onto a hub 46, which is rotatable on the shaft 42. A spiral spring 47 provides a flexible connection between the armature 44 and the fly wheel 45. The fly wheel is provided to enable the armature to fall into step at synchronous speed when the motor is started, and to this end has the proper natural frequency of oscillation about the shaft 42, as determined by its weight and the stiffness of spring 47.

The shaft 42 extends through bearing 49 and supports the dial shaft 73 by means of the hollow hub 54 and the ball bearings 50 and 51. The inner ball races have a press fit on the end of shaft 42 and are thus fixed to the shaft. The hub 54 is removably fitted to the outer races and is held in position by a set screw 56, engaging one of these outer races. Shaft 73 is rigidly fixed to hub 54 and is in axial alignment with shaft 42. The armature 55 of the correcting mechanism is carried on hub 54, as shown. This device also includes the field magnet 65, which is secured to the frame plate 25 by spacers 69 and small bolts, as seen clearly in Figs. 7 and 8.

The dial 16 is mounted on the end of shaft 73. The dial may be made of Celluloid and has a metal disc on each side of it to give the requisite stiffness, and to increase its weight to the proper amount for a purpose which will be explained. These discs with the dial 16 between them are clamped against the head of a short bolt 70 by means of a nut 71. The shank of the bolt is drilled out to the proper size to receive the end of shaft 73, and is slotted and slightly tapered so that it can be locked on the shaft by the nut 72.

It will be seen, therefore, that the dial shaft 73 is rotatable with respect to the shaft 42 on which it is supported. Such rotation is, however, opposed by a friction device including the spring washer 53. This washer is interposed on shaft 42 between the end of hub 54 and a disc 52, which latter is locked to the shaft by a set screw 57. The washer 53, shaped as shown in Fig. 10, bears against the hub 54 at its outer rim and against the disc 52 at its central portion near the shaft 42. The arrangement described thus constitutes a friction clutch by means of which shaft 73 and dial 16 may be driven by shaft 42. The amount of friction required is very small and may be regulated by moving disc 52 to the right or left along shaft 42, after loosening the set screw 57.

The arrangement for starting the motor is shown in Figs. 1 and 9, and in detail in Fig. 5. There is an opening in the casing 1 to receive the hollow threaded bearing member 76'. The head 77 of this bearing member rests against the outside of the casing 1. A washer 78 and nut 79 serve to rigidly secure the bearing member to the casing. Inside the bearing member 76' is fitted a shaft 77', having a head 78' to which is attached the operating lever 5. The latter appears in Fig. 1, as well as in Fig. 5. Surrounding the shaft 77' is a coiled spring 80. One end of spring 80 is attached to the fixed bearing member 76' and the other end to a collar 81 on shaft 77', and the spring is wound in the proper direction to oppose counterclockwise rotation of shaft 77', as seen in Fig. 9. The spring is tensioned by rotating the collar around shaft 77'. When the desired tension is obtained, the collar is locked in place by a set screw. The shaft 77' is rotated by pulling down on lever 5, and a pin 79' serves to limit the rotation to about 15° or so. At the end of shaft 77' there is a hollow sleeve 82 secured to the shaft by a set screw and crossbored to receive the rod 83, which is also secured by a set screw. The rod 83 extends at right angles to shaft 77', as seen in Fig. 9, and is in line with the toothed armature 44. At the end of rod 83 there is attached a spring 84. When the operating lever 5 is pulled down, the shaft 77' is rotated against the tension of spring 80, and the rod 83 and spring 84 are moved to the position shown by the dotted lines in Fig. 9. In this position the end of spring 84 engages a tooth of the armature 44. The handle is now released, whereupon the spring 80 quickly restores the parts, and the spring 84 imparts a spin to the armature.

It will be seen that the arrangement of the starting mechanism is such as to start the motor in the proper direction to rotate the dial 16 counterclockwise, as viewed through the windows in panel 6 on the front of the casing. The dial may be made of Celluloid or other transparent material, and the calibrations are placed thereon by a process which leaves the entire background opaque while only the scale division marks and the numerals remain transparent. (See Fig. 6.) There are three scales, the first having ten zeros, or ten identical sections; the second having eleven sections, and the third or outer scale having twelve sections. The three different scales are for timing five, five and one-half, and six beat watches, respectively.

Just back of the windows and in front of the dial 16 is an indicator 15, the function of which is to record the position of the zero at the beginning of a test for purposes of comparison with its position at the end of the test, as will be explained more fully subsequently. The details of the arrangement for mounting the pointer are shown in Fig. 11. There is a bearing member 86 secured to the casing 1 by a nut 87. Rotatable in the bearing member 86 is a shaft 88 having a head at one end to which the pointer 15 is attached. Outside the casing the knob 7 is secured to the shaft by a set screw. There may be a washer under the head of shaft 88, and another next to the knob 7, and between the latter washer and the head of bearing member 86 is inserted a spring washer 89. When the knob 7 is put on, the washer 89 is compressed so as to provide enough friction to hold the pointer in any position to which it is moved. It will be noted that, since the shaft 88 is in alignment with the axis of the dial 16, the pointer will always be parallel to the scale divisions which are just beneath it.

The motor unit is preferably wired up complete as a unit so that it can be removed from the casing without undue disturbance of the wiring. To this end a terminal strip 37 is provided, secured to the frame plate 26 by means of two screws, such as 39, a pair of spacers, such as 38, being inserted between the frame plate and the terminal strip 37. The terminal strip 37 carries a row of six terminals. At the upper side of the terminal strip are attached two conductors coming from the winding 66 of the correcting magnet 65, two conductors coming from the winding 61 of the motor magnet 60, and two conductors from the lamp sockets 75. At the lower side of the terminal strip are attached six conductors which extend to the chassis 19, where they are connected as shown in the circuit drawing, Fig. 12. These conductors are preferably left long enough so that the chassis can be pulled out far enough for purposes of inspection or repair, as referred to hereinbefore.

Figure 12:
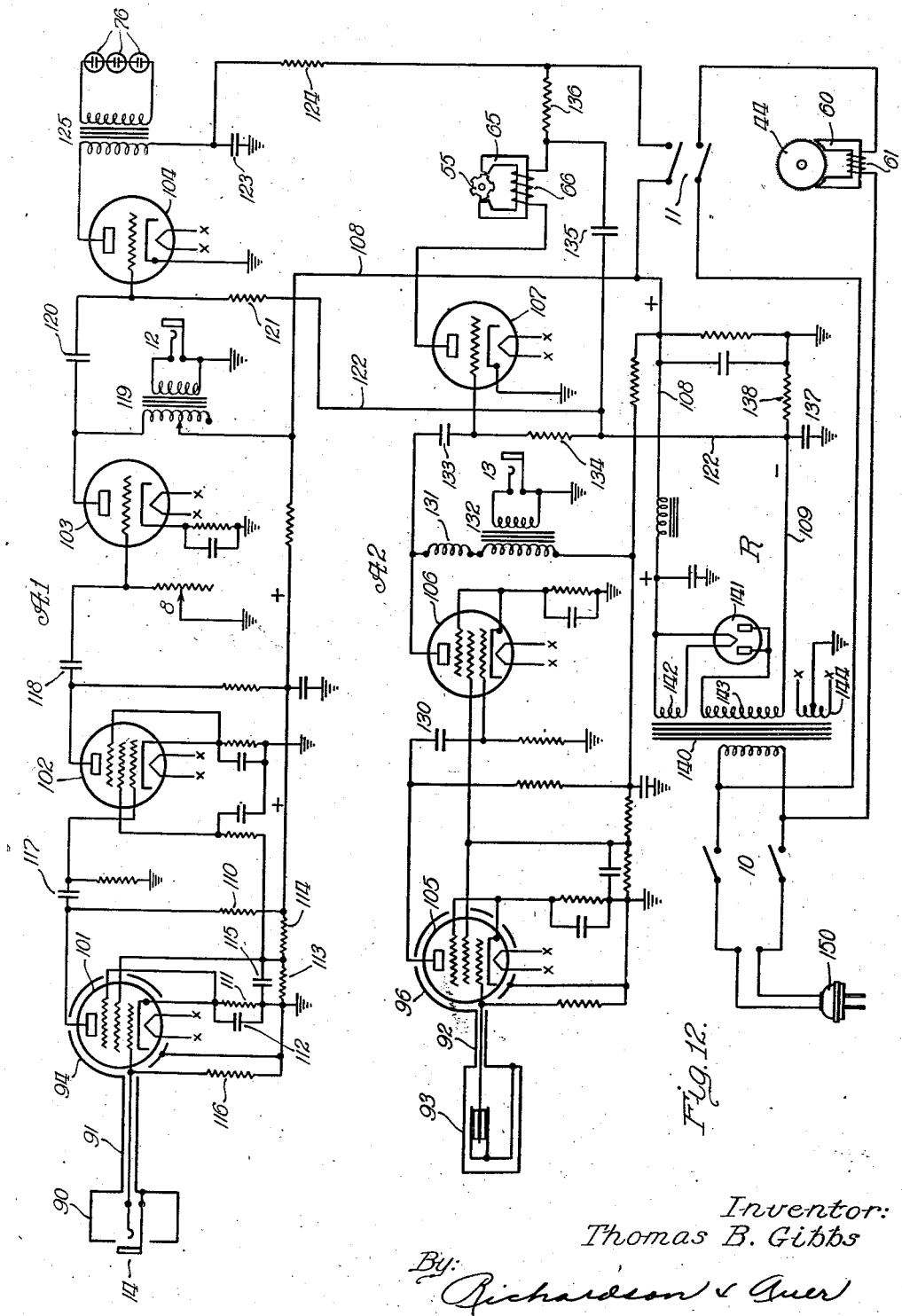
Fig. 12 is a schematic diagram of the electrical connections.

Referring now, to the circuit drawing, Fig. 12, the reference letter $A^1$ indicates an amplifier for amplifying tick impulses produced by a watch under test and received by way of jack 14, and for modifying the amplified impulses to a form suitable for operating the lamps 76. As shown herein, the amplifier may comprise two "type 57" pentodes 101 and 102, a "type 56" triode 103, and a "type 885" thyratron 104.

Describing this amplifier and the circuit connections briefly, the jack 14 is enclosed in a metal box or casing 90 (seen also in Fig. 2), and the sleeve of the jack is connected to this casing. The tip spring of the jack has a conductor leading therefrom to the control grid of the first pentode 101. This conductor is shielded all the way by a woven metallic sleeve 91 which is conductively connected at one end to the metal box 90 and at the other end to the cap 94 of the shielding can surrounding the pentode. As this can is grounded, the latter connection serves to ground the sleeve 91 and the box 90, and also the sleeve of the jack 14. As a result, the connection from the tip of the jack to the control grid of the tube is completely shielded.

The circuit connections for the amplifying pentode 101 are more or less conventional. The plate is connected to the plus B lead through a resistor 110. The suppressor grid, the grid next to the plate, is connected to the cathode, and the latter is connected to ground through a resistor 111, which is an arrangement commonly employed to provide a negative grid bias for the cathode. The resistor 111 is shunted by a by-pass condenser 112. The screen grid of the tube is connected to the plus B lead at a point between the resistances 113 and 114, so that the voltage at the screen grid will be somewhat less than that at the plate. The reference character 116 indicates a high resistance grid leak connected between the control grid and ground.

The plate circuit of the pentode 101 is coupled to the control grid of the pentode 102 by means of a condenser 117. The circuit arrangement of this tube is similar to that of the tube 101 and consequently it need not be described further.

The plate circuit of the pentode 102 is coupled to the control grid of the triode 103 by means of a condenser 118. The control grid of this tube is provided with an adjustable grid leak 8 which is used as a volume control. The same reference numeral is used to indicate the volume control in Fig. 1. The usual arrangement is used to provide a negative bias for the cathode. The plate circuit of the tube includes the primary winding of a transformer 119, the secondary winding of which is connected to the phone jack 12.

The plate circuit of the triode 103 is coupled to the control grid of the thyratron 104 by means of a condenser 120. This control grid is connected to the negative side of the rectifier R, lead 109, through resistor 121 and conductor 122, so that the tube is normally biased to cut-off condition; that is, it normally passes no current. Associated with the plate circuit of the thyratron 104 is a condenser 123. One side of this condenser is grounded and the other side is connected through a resistor 124 to the plus B lead 108, assuming that the switch 11 is closed. The condenser 123 therefore is normally charged, and may be discharged through the primary winding of the transformer 125 and the cathode plate circuit of the thyratron 104 when the negative grid bias on the control grid of the tube is reduced enough to cause the tube to pass current. The secondary winding of the transformer 125 is connected to the lamps 76, which are arranged in series with each other.

Just below the amplifier A$^1$ is shown an amplifier A$^2$, which comprises two "type 57" pentodes 105 and 106 and a "type 885" thyratron 107. The function of this amplifier is to amplify tick impulses received from the microphone 93 and suitably modify these impulses for operating the correcting mechanism including the winding 66 and the armature 55.

As mentioned hereinbefore, the microphone 93 is preferably of the piezo-electric type, as disclosed in my co-pending application filed on even date herewith. One terminal of the microphone, preferably the one connected to the central electrode of the crystal element, is connected by a conductor to the control grid of the first pentode 105. This conductor is surrounded by metallic sheath 92 which is connected at one end to the casing of the microphone 93 and at the other end to the cap 96 of the shielding can of the tube. The other terminal of the crystal element is connected to the microphone casing as shown, and is therefore grounded through the casing, the sheath 92, the cap 96, and the can.

The circuit arrangement of the pentode 105 is similar to that of the tube 101 in the amplifier A$^1$ and consequently need not be described in detail.

The plate circuit of the tube 105 is connected to the control grid of the pentode 106 by means of a condenser 130. The circuit arrangement of this tube is similar to that of tube 105, insofar as the cathode and grid elements are concerned. The plate circuit of the tube includes the primary winding of a transformer 132, the secondary winding of which is connected to the phone jack 13.

The plate circuit of the tube 106 is coupled to the control grid of the thyratron 107 by means of a condenser 133. This control grid has a cut-off negative bias on it like the control grid of the thyratron 104 previously described, being connected to the negative output 109 of the rectifier R by way of resistor 134 and conductor 122. The condenser 135 has one side connected to conductor 122 and the other side connected to the plus B lead through the resistor 136 and contacts of the switch 11, and is normally charged to the full output potential of the rectifier. When the grid of the thyratron 107 has its negative bias reduced enough to enable the tube to pass current, the condenser 135 discharges over a path which may be traced from the left-hand side of the condenser by way of conductor 122, condenser 137, ground, the cathode of tube 107, plate of said tube 107, winding 66 of the correcting magnet 65 and thence to the right-hand terminal of the condenser 135. There is also a shunt around the condenser 137 which includes the resistor 138 through which a portion of the discharge current flows.

The condensers 123 and 135 and the resistors 124 and 136 must of course have capacity and resistance values suited to the action which it is desired to obtain, as will be described in detail in discussing the operation. It may be stated here, however, that the condensers 123 and 135 may have capacities of one microfarad and eight microfarads, respectively, while the resistance of resistor 124 may be 50,000 ohms and that of resistor 136 may be 10,000 ohms. The condenser 137 is a large condenser having a capacity of at least eight microfarads. The resistor 138 may have a resistance of about 3,000 ohms.

The rectifier R is a conventional type of half wave rectifier. It comprises a transformer 140 and a rectifier tube 141. This transformer has a secondary winding 142 for supplying current to the cathode of the rectifier tube 141. The cathode is connected through a suitable filter to the plus B lead 108. The transformer also has a rectifier winding 143, one terminal of which is connected to the plates of the rectifier tube while the other terminal is connected to the negative output lead 109 and through the resistor 138 to ground. A third winding 144 of the transformer serves to provide heater current for the amplifier tubes and for the two thyratrons. It will be understood that the various heater circuits which are labeled X—X in the drawings are connected to the terminals X—X of the winding 144.

The apparatus operates from 60-cycle commercial power. The reference character 150 indicates a plug, also seen in Fig. 2, which may be inserted in any convenient outlet, thereby establishing connection from the power mains to the switch 10. By closing the switch 10, the circuit may be further extended to include the primary winding of the transformer 140, thus placing the rectifier and the amplifiers in operation. The switch 11 closes the power circuit through to the winding 61 of the motor, and also extends the plus B lead 108 through to the condensers 123 and 136.

The operation of the complete watch timing apparatus will now be described. For this purpose it will be assumed that a master watch which has been previously adjusted to keep correct time is clamped to the microphone 93. The master watch should be a five-beat watch, and should be adjusted so that successive beats are evenly spaced. It will also be assumed that a second microphone is connected to the jack 14, and that the watch to be tested is clamped to the second microphone. This second microphone is preferably provided with a separate stand and mounting, as described in my co-pending application hereinbefore referred to, and with a shielded cord terminating in a plug for insertion in a jack, such as jack 14. The switches 10 and 11 are closed, so that current is supplied to the motor and to the rectifier.

The motor is started by pulling down on the lever 5 and releasing it. As mentioned hereinbefore, this gives the armature 44 a spin in a counter-clockwise direction, as seen from the front, or in Fig. 9. The initial spin given the armature rotates it well above synchronous speed, but it slows down gradually; and when it reaches synchronous speed it falls in step with the assistance of the flywheel 45. The winding 61 of the field magnet 60 being connected directly across the 60-cycle commercial power circuit, the magnet 60 is energized at each half cycle, or at the rate of 120 times per second. Running at synchronous speed, the armature 44 advances one tooth on each energization of the magnet, and if it is provided with 120 teeth, therefore, it will rotate at a speed of one revolution per second. The dial 16 is thus driven in a counterclockwise direction and makes one revolution per second at least approximately, independent of any action by the correcting mechanism.

The frequency of the 60-cycle commercial power source varies slightly in both directions from a mean frequency of 60 cycles per second, due mainly to the operation of the regulating apparatus which requires a slight departure from the frequency standard in order to become effective. While the average frequency is therefore held very close to 60 cycles per second, at any given instant the frequency may be either slightly below or slightly above this value. It is the purpose of the correcting mechanism to compensate for slight variations in the frequency of the commercial power current and to cause the dial 16 to rotate constantly at a speed of exactly one revolution per second. The operation of the correcting mechanism will now be described.

As mentioned before, the master watch is a five-beat watch, and at each beat or tick an impulse is produced by the microphone 93, which is transmitted to the grid of the amplifying pentode 105. This impulse is amplified and is passed on through the condenser 130 to the control grid on the amplifying pentode 106, all in a manner which will be well understood and which need not, therefore, be described in detail. As the pentode 106 passes current responsive to the received impulse the potential at the plate of the tube is reduced, and the condenser 133, which is normally fully charged, discharges with the result that the negative potential at the grid of the thyratron 107 is reduced sufficiently to allow the tube to pass current. Accordingly, the condenser 135, which is normally charged through the resistor 136, discharges over the path previously described, including the tube 107 and the winding 66 of the correcting magnet 65. The discharge of the condenser is very rapid, and has the effect of inserting the high resistance 136 in the plate circuit of the thyratron 107, which extinguishes the tube and plate current ceases to flow. As soon as the discharge path for condenser 135 is opened at the tube 107, the condenser begins to charge up again through the resistor 136, and the resistor has such a value that the condenser 135 cannot charge fast enough to permit the thyratron to fire a second time on the same impulse, but does become charged up enough to supply sufficient plate voltage to operate the thyratron by the time the second tick impulse arrives. Thus it will be seen that at each tick of the master watch an impulse is produced which is amplified by the tubes 105 and 106 and which is effective to trigger the thyratron 107 and permit the condenser 135 to discharge through the tube and through the winding 66 of the correcting magnet 65. The impulses thus transmitted to winding 66, being derived from the master watch, have a frequency of exactly five per second.

The effect of these impulses may now be considered. Referring to Fig. 8, it will be seen that the armature 55 of the correcting device has five poles which are so related to the two poles of the magnet 65 that five times during each revolution of the dial a pair of armature poles will pass between the field poles and close the magnetic circuit for the field magnet. When the apparatus is first started up, the magnet winding 66 will receive the first impulse from the master watch at a time when the armature 55 is in some random position, not necessarily the position in which it appears in Fig. 8. If the armature is in some other position, the energization of magnet 65 responsive to the first impulse will rotate the armature 55 in one direction or the other in an attempt to bring the nearest adjacent pair of armature poles between the poles of the field magnet. This operation, of course, rotates the dial shaft 73 relative to the motor shaft 42, but without disturbing the motor, as the friction clutch including the spring washer 53 offers only a small resistance to such relative (movement, too little to appreciably affect the motor.

If the armature is only slightly displaced from the position in which it is shown in Fig. 8 when the first impulse is received, it will be rotated a sufficient amount by the first impulse; but if a considerable movement is required, one impulse will not be enough. This is due to the inertia of the weighted dial and to the transient character of the impulses. For reasons which will be explained, the inertia of the dial is so related to the strength and duration of the impulses that each impulse can only produce a very limited rotation of the armature 55 and dial shaft relative to shaft 42. It follows, therefore, that if a considerable initial correction is required, a number of impulses will be needed to effect the correction; the armature being rotated a trifle relative to shaft 42 by each impulse until its adjustment is such that, when the next impulse comes in, no further relative movement can take place.

The apparatus now continues to run and, as subsequent impulses from the master watch are received at winding 66, each impulse will come in at a time when the armature 55 is in the position in which it is shown in Fig. 8, so that the impulses will have no effect. This is on the assumption, of course, that the motor is running at a speed of exactly one revolution a second. Now if the frequency of the commercial power supply changes to a value which is slightly lower than 60 cycles per second, the motor will begin to run a little too slow, and the armature 55 will not quite reach the position in which it is shown in Fig. 8 at the time each impulse is received from the master watch. That is, the armature poles entering between the poles of the magnet 65 at the time impulses are received by winding 66 will lag a trifle and will be in such a position that the armature will receive a slight correcting pull each time, effective to speed up the dial 16 enough to make up for the decrease in the speed of the motor.

On the other hand, if the frequency of the commercial power source should increase, the motor will run too fast and it follows, therefore, that each time the winding 66 receives an impulse from the master watch the pair of poles then passing between the poles of the magnet 65 will have passed clear through and will be in such a position that the energization of the magnet 65 will be effective to exert a backward pull on the armature 55 and slow the dial 16 down to the necessary extent.

The necessity for weighting the dial may now be briefly explained. If the dial is not weighted, a correcting impulse coming in at a time when the armature 55 is out of phase will produce far too great a relative movement of the armature with respect to the motor shaft, and may even give it several complete rotations relative to the motor, leaving the armature in a random position, from which it is again rotated by the next impulse. If by any chance the dial should stop in the proper position, the same thing will happen again as soon as the motor speed gets enough out of phase for the correcting mechanism to function. The result is that the correcting mechanism is totally inoperative.

The described phenomena cannot be eliminated by attenuating the strength of the correcting impulses, because of the known characteristic of a friction clutch, which requires considerably more power to start relative movement of the parts than is required to continue such movement. The correcting impulses must have ample strength to break down the initial resistance at the clutch; and, as this is much more than is required to maintain the movement after it is once started, the impulses have power enough to develop considerable acceleration, with the result above stated.

By adding the proper amount of weight to the dial, the desired operation can be secured. When a correcting impulse comes in, the entire power is applied to breaking down the clutch resistance, the inertia of the weighted dial having no effect whatever. As soon as the clutch resistance is overcome, relative movement of the parts begins, and the dial is either accelerated or decelerated, but such action is instantly opposed by the inertia of the dial which tends to keep it running at the same speed. The dial is made heavy enough so that only a very slight change in its speed is produced before the impulse is expended, and thus only a very small movement of the armature 55 relative to the shaft 42 can occur at each correcting impulse.

In the foregoing it has been assumed that the motor armature 44 has 120 teeth, which will cause the motor to run at a speed of one revolution per second, or at approximately that speed, depending on how far off, if any, the frequency of the commercial current departs from the standard 60-cycle frequency. This assumption has been made in order to facilitate a complete explanation of the operation of the correcting device. When the motor armature 45 has 120 teeth, however, a defect is introduced due to the fact that the frequency of the commercial current varies in both directions from the standard frequency, and the motor accordingly will at times run too slowly and at other times will run too fast. When the motor is running too slowly, the armature 55 will lag behind the impulses from the master watch, and the necessary corrections will take place at times when the armature poles have not entirely entered between the pole pieces of magnet 65. When the motor is running too fast, on the other hand, the armature 55 will lead the master watch impulses, and corrections will take place at times when the armature poles have passed slightly out from between the pole pieces of the magnet 65. These two different positions at which the corrections take place, when referred to the calibrations of the dial, may be as far as one or two scale divisions apart; and, if the change in the commercial frequency from below standard to above standard should occur during a test period, it would introduce a considerable error.

In view of the foregoing, the armature 44 is preferably made with less than 120 teeth, say 118 or 119, so that the motor will always run too fast. The correcting mechanism, therefore, always operates to retard or slow down the dial, and the defect referred to is eliminated.

Assuming now that the dial 16 is being properly driven at the correct speed of exactly one revolution per second, consideration may be given to the flashing of the lamps 76 under control of the beats or ticks of the watch under test. As previously mentioned, this watch is clamped to the test watch microphone, which has been plugged in to jack 14, and accordingly each time the watch ticks an impulse will be transmitted to the control grid of the amplifying pentode 101. These impulses are amplified and are transmitted to the control grid of the pentode 102, where they are further amplified, and then become effective on the control grid of the triode 103. The output of the triode being coupled to the control grid of the thyratron 104, each impulse causes the latter tube to become conducting and afford a discharge path for the condenser 123. This discharge path includes the cathode and plate of thyratron 104 and the primary winding of transformer 125, and accordingly at each discharge of the condenser a current is induced in the secondary winding of the transformer which lights the lamps 76. Lamps 76 are neon glow lamps. The operation of thyratron 104 is similar to that of thyratron 107 already described. When the condenser 123 discharges the voltage on the plate of the thyratron is reduced sufficient to extinguish the tube, owing to the presence in the plate circuit of the high resistance 124. The circuit through the tube being open, the condenser 123 charges up again through resistance 124, and the value of this resistance is such that the condenser will have just time enough to become charged by the time that the next impulse is received at the grid of the thyratron. The condenser 123 discharges with extreme rapidity, so that the flashes which take place at the lamps 76 are of extremely short duration.

The lamps 76 are positioned directly in back of that portion of the dial 16 which can be seen through the windows in the panel 6, Fig. 1. The dial is opaque except for the scale divisions and the numerals, and consequently each time the lamps flash, the light shines through these numerals and scale divisions, and they become visible in the positions they occupy at the instant the flash occurs. Recalling now that the inner scale, which is the scale for testing five-beat watches, has ten sections and that the dial is rotating at a speed of one revolution per second, and assuming that the watch under test is a five-beat watch, the lamps 76 will flash while every alternate section is passing the associated window. The sections are identical, and it follows, therefore, that during successive flashes of the lamps, it wil appear to the operator that he is viewing the same section of the dial. Moreover, if the watch under test is keeping correct time, the lamp flashes will occur exactly one-fifth of a second apart, or five times per second, and the section of the dial which is apparently being viewed will appear to stand still. This effect is due to the extremely short duration of the lamp flashes and to the persistency of vision. The frequency of the lamp flashes is so low that, as a matter of fact, there is considerable flicker, but the result is good enough for all practical purposes.

In testing a watch, the operator first observes that the dial is running all right at synchronous speed, and that the lamps are flashing properly. The volume control 8 is adjusted if necessary, to suit the strength of the beat of the watch being tested. Assuming that a five-beat watch is being tested, he will then observe the position of a zero mark on the inner scale of the dial, selecting the one which is closest to the center of the scale, and will adjust the indicator 15 by means of the knob 7 so that the pointer lies over the zero scale division. If the watch is running correctly, the zero mark will remain in this position.

Assuming now that the watch is running too slowly, the dial will gain a little on the lamp flashes, and as a result the zero mark will move gradually away from the pointer 15 to the left, the speed of the movement depending on how much the watch is out of time. A practical procedure is to record the zero position by means of the pointer and then observe the position of the zero mark after a period of one minute has elapsed. For every degree or space on the dial that the zero drifts to the left during a period of one minute, the watch is 14.4 seconds slow per day.

Assuming now that the watch under test is running too fast, the lamp flashes will occur a little too early each time, and as a result the zero mark, the initial position of which has been recorded by the indicator, will appear to drift to the right. In conducting a one minute test, a drift of one scale division will, of course, indicate that the watch is running too fast by 14.4 seconds per day.

In testing a five and one-half beat watch, the procedure is the same, except that the middle scale on the dial is used. This scale has eleven sections, and consequently alternate sections will pass under the window each time the lamps flash, the same as when testing a five-beat watch. The outer scale, which has twelve sections, is provided for testing six-beat watches.

When a five and one-half beat watch is being tested, a drift of one degree during a one minute test period indicates that the watch is 13 seconds fast or slow per day, as the case may be, depending on whether the drift is to the right or left. In testing a twelve-beat watch, a drift of one scale division during the one minute test means that the watch is twelve seconds fast or slow per day. It is customary to furnish a chart with each apparatus, from which the amount (in seconds per day) by which any type of watch is running too fast or too slowly can be determined directly without calculation. The chart may be arranged to show the time variation in seconds per day for any drift from one-half a scale division to ten scale divisions, and for any timing period from one-half minute to five minutes. In this connection it will be understood that, if a watch is considerably out of time, the timing period can be conveniently shortened to one-half minute; while, if it is running nearly correct, the timing period will have to be lengthened before the variation will begin to show up appreciably on the dial.

In order to avoid the use of a chart, a direct reading scale may be employed, as illustrated in Fig. 13. Referring to Fig. 13, the reference character 7 indicates the knob which is shown in Fig. 1 and also in Fig. 11 as a means for adjusting the indicator or pointer 15. In the modification, Fig. 13, this knob is modified by adding thereto a pointer 151. This pointer 151 may, for example, be attached to the relatively thick washer which is shown in Fig. 11 as lying between the knob 7 and the spring washer 89; the recess in which the washer lies being extended to the lower side of the knob. The pointer 151 is movable relative to the knob 7 and shaft 88, but if the knob is turned to adjust the indicator 15, the pointer 151 is moved also. In order to adjust the pointer 151, a small handle 152 may be provided. The reference characeer 153 indicates a scale which has a zero index at the center and which is calibrated in seconds per day. In view of the small size of the drawings, only the scale divisions are shown.

In using this direct reading attachment, the operator will first observe the position of the zero mark on the dial 16 as it appears through the window in the casing, and by means of the knob 7 he will adjust the pointer 15 to make it coincide with the position of the zero mark. The operator will then immediately adjust the pointer 151 until it stands at zero on the scale 153. The watch under test is now allowed to run for a period of one minute, whereupon if the zero mark has drifted to the right or left, its new position is noted and the pointer 15 is adjusted accordingly. The operation of adjusting pointer 15 by means of knob 7 of course changes the position of the pointer 151 which will now indicate one or more scale divisions to the right or left of the zero position on scale 153. As mentioned before, the scale 153 is calibrated in seconds per day, and accordingly the amount of the departure from the correct time can be read directly. Only a single direct reading scale is required for all three types of watches, that is, for five-beat watches, five and one-half-beat watches, and six-beat watches.

A head phone may also be furnished, equipped with a plug adapted for insertion in jack 12 or jack 13. By using the head phone, the operator is able to listen to the ticking of the watch under test and compare it with the ticking of the master watch, if desired. When listening at jack 12 to the watch under test, the volume control 8 may be adjusted to obtain the desired intensity of sound. An audible test of this kind will often disclose defects or maladjustments which have to be corrected before time regulation can be advantageously undertaken.

In the description of the apparatus, the shielding of the tick impulse circuits incoming to the first stages of the amplifiers was explained in considerable detail, and for emphasis it may be stated here that too much attention cannot be paid to this feature. These circuits should be thoroughly and completely shielded, as even a very short exposed section will pick up so much interference as to render the apparatus inoperative in ordinary locations outside of a laboratory.

While I have described a certain specific embodiment herein, it will be understood that modification may be made without departing from the principles of the invention; and I do not, therefore, wish to be limited to the precise form and construction disclosed, but desire to secure and have protected by Letters Patent all forms and modifications of my invention that come within the scope of the appended claims.

What I claim is:

1. In a watch timing apparatus, a reference dial adapted to be used for timing a watch when rotated at a predetermined constant speed, a synchronous motor for rotating said dial and arranged to always drive the same at a speed which is faster than said predetermined speed, a master watch, and means responsive to ticks of said master watch to retard the dial and cause it to be driven at said predetermined speed.

2. In a watch timing apparatus, a reference member adapted to be used in watch timing when driven at a predetermined speed, a synchronous motor for driving said reference member, said motor operating from a commercial A. C. power source and arranged to always drive said reference member too fast regardless of normal variations in the frequency of said power source, a source of impulses of constant frequency, and means responsive to such impulses for slowing the dial down to said predetermined speed.

3. In a watch timing apparatus, a reference member adapted to be used in watch timing when driven at a predetermined constant speed, a synchronous motor for driving said reference member, said motor operating from an A. C. power system the frequency of which is subject to variations and arranged to drive said reference member at a speed which always differs from said predetermined speed in the same direction regardless of said variations, a source of impulses of constant frequency, and means responsive to said impulses for causing a relative movement between said reference member and said motor to correct for the difference in speed.

4. In a watch timing apparatus, a rotatable dial, said dial being opaque to light except for transparent calibrations thereon, a casing surrounding said dial and having a window past which said calibrations move when the dial is rotated, lighting means behind said dial and in line with said window, and means controlled responsive to the ticking of a watch being tested for periodically actuating said lighting means to throw light through the transparent calibrations on said dial and render them visible through said window.

5. In a watch timing apparatus, a slow speed synchronous motor, a dial driven by said motor, a correcting magnet, means including said magnet for regulating the dial speed independent of the motor speed, a winding for said magnet, a condenser, a circuit including a high resistance for charging said condenser, a thyratron normally biased to cut-off, a master watch, means responsive to a beat of said watch to alter the bias on said thyratron to cause the same to become conductive, and a discharge circuit for said condenser including said thyratron and the winding of said correcting magnet.

6. In a timing apparatus, a shaft, a reference member, means for rotatably mounting said member on said shaft, said means comprising a housing to which said member is secured and ball bearings in said housing, means including an armature mounted on said housing for rotating said member relative to said shaft, means for rotating said shaft, and a friction clutch including said housing and a part mounted on said shaft for causing said shaft to drive said member.

7. In a timing apparatus, a shaft, a reference member, means for rotatably mounting said member on said shaft, said means comprising a housing to which said member is secured and ball bearings in said housing, means including an armature mounted on said housing for rotating said member relative to said shaft, means for rotating said shaft, a friction clutch including said housing, a spring washer, and a part mounted on said shaft for causing said shaft to drive said member, and means permitting adjustment of said part to regulate the resistance of said clutch.

8. In a timing apparatus, a graduated reference member, means for rotating said member at constant speed, means controlled by the device being timed for producing light flashes to illuminate said member, an adjustable indicator cooperating with the graduations on said member, a scale, a second adjustable indicator cooperating with said scale, and means whereby adjustment of the first indicator effects corresponding adjustment of the second whereas the adjustment of the second indicator has no effect on the first indicator.

9. In a stroboscopic watch timing apparatus, a dial provided with a plurality of circular rows of graduations for use, respectively, in timing watches having different beat frequencies, each row comprising a different number of duplicate sections, means for rotating said dial at the same constant speed regardless of the beat frequency of the watch being tested, and means responsive to the beats of the watch being tested for producing light flashes to illuminate at least one section in the row of graduations corresponding to the watch being tested, the rotational speed of the dial and the number of sections in the said corresponding row being so related to the beat frequency of the watch being tested that if the rate of the watch is correct the sections of said corresponding row which are illuminated by successive light flashes will appear in the same angular position.

10. In a stroboscopic type of timing apparatus, a dial provided with a plurality of circular rows of graduations for use, respectively, in timing impulses of different frequencies, each row of graduations having a different number of equally spaced zero points, means for rotating said dial at the same constant speed regardless of the frequency of the impulses being timed, and means responsive to the impulses being timed for producing light flashes to illuminate a portion of the dial passing a stationary reference point, the rotational speed of the dial and the number of zero points in the row of graduations corresponding to the impulses being timed being so related to the supposed frequency of such impulses that if the frequency is correct the zero points in said corresponding row which are illuminated by successive light flashes will appear in the same position relative to said reference point.

THOMAS B. GIBBS.